United States Patent
Wright et al.

(10) Patent No.: US 10,337,912 B2
(45) Date of Patent: Jul. 2, 2019

(54) SENSOR SUPPORT FOR USE WITH LIGHTING REFRACTOR

(71) Applicant: LSI Industries, Inc., Cincinnati, OH (US)

(72) Inventors: Travis Wright, Cincinnati, OH (US); John D. Boyer, Lebanon, OH (US); Travis Schubert, Cincinnati, OH (US)

(73) Assignee: LSI Industries, Inc., Cincinnati, OH (US)

( * ) Notice: Subject to any disclaimer, the term of this patent is extended or adjusted under 35 U.S.C. 154(b) by 96 days.

(21) Appl. No.: 15/221,781

(22) Filed: Jul. 28, 2016

(65) Prior Publication Data

US 2018/0031416 A1     Feb. 1, 2018

(51) Int. Cl.
| | |
|---|---|
| *G01J 1/02* | (2006.01) |
| *G01J 1/42* | (2006.01) |
| *F21V 17/10* | (2006.01) |
| *F21V 17/12* | (2006.01) |
| *F21V 23/04* | (2006.01) |
| *F21Y 115/10* | (2016.01) |
| *F21Y 105/18* | (2016.01) |

(52) U.S. Cl.
CPC .......... *G01J 1/0271* (2013.01); *F21V 17/104* (2013.01); *F21V 17/12* (2013.01); *F21V 23/0464* (2013.01); *F21V 23/0471* (2013.01); *G01J 1/42* (2013.01); *F21Y 2105/18* (2016.08); *F21Y 2115/10* (2016.08)

(58) Field of Classification Search
CPC .......... G01J 1/0271; G01J 1/42; F21V 17/04; F21V 17/10; F21V 17/104; F21V 17/12; F21V 23/0464; F21V 23/0471; F21Y 2105/18; F21Y 2115/10
USPC .................................................... 362/311.01
See application file for complete search history.

(56) References Cited

U.S. PATENT DOCUMENTS

| | | | | |
|---|---|---|---|---|
| 7,264,380 B1* | 9/2007 | Monroe | ............ | F21V 11/16 362/352 |
| 8,636,385 B2* | 1/2014 | Fabbri | ............ | F21S 8/02 362/148 |
| 2004/0240208 A1* | 12/2004 | Beasley | ............ | H05B 41/38 362/276 |
| 2008/0061668 A1* | 3/2008 | Spiro | ............ | F21S 8/06 313/113 |
| 2016/0377275 A1* | 12/2016 | Lim | ............ | G01J 5/0806 362/362 |

* cited by examiner

*Primary Examiner* — Bao Q Truong
(74) *Attorney, Agent, or Firm* — Wood Herron & Evans LLP

(57) ABSTRACT

A sensor support for use with a lighting refractor includes a housing defining an interior cavity configured to receive and support a sensor for sensing at least one of motion or light. The sensor support further includes a locking structure operatively associated with the housing and configured to selectively attach the housing to a peripheral portion of a lighting refractor, and an aperture in the housing arranged to expose the sensor to an environment around the lighting refractor. Sensor and lighting unit assemblies are also disclosed. A sensor assembly includes the sensor support and a sensor configured to sense at least one of motion or light. A lighting unit assembly includes the sensor support and a lighting unit having a refractor with a peripheral portion.

13 Claims, 8 Drawing Sheets

SENSOR SUPPORT FOR USE WITH LIGHTING REFRACTOR

TECHNICAL FIELD

The present invention relates generally to lighting systems, and more particularly, to sensor controls for lighting systems.

BACKGROUND

Electrical lighting units, commonly referred to as "luminaires," are used in various types of indoor and outdoor lighting applications. "Low bay" indoor applications generally include mounting lighting units at heights of approximately 20 feet or less, whereas "high bay" indoor applications generally include mounting lighting units at ceiling heights of approximately 20 to 45 feet, or sometimes higher. Conventional lighting units for high bay and low bay applications generally include a light housing that is suspended from a ceiling structure and houses a light source, and a generally conical or bell-shaped refractor that depends downwardly from the light housing and directs light produced by the light source.

In many lighting applications, it is desirable to provide a sensor for detecting a local condition (e.g., motion, light, etc.) in a region surrounding the lighting system, and causing the lighting system to energize one or more of the individual lighting units only in response to detection of the condition by the sensor. In this manner, energy is substantially conserved by ensuring that lighting units are energized only when appropriate. In conventional lighting systems, such sensors are mounted remotely from the lighting units. While attempts have been made to mount sensors directly to the lighting units, in such designs the sensors undesirably block at least some of the light produced by the lighting units.

Accordingly, there is a need for improvements to known lighting systems to address at least the drawbacks discussed above.

SUMMARY

According to an exemplary embodiment in accordance with the principles of the invention, a sensor support for use with a lighting refractor includes a housing defining an interior cavity configured to receive and support a sensor for sensing at least one of motion or light. The sensor support further includes a locking structure operatively associated with the housing and configured to selectively attach the housing to a peripheral portion of a lighting refractor, and an aperture in the housing and arranged to expose the sensor to an environment around the lighting refractor.

According to another exemplary embodiment in accordance with the principles of the invention, a sensor assembly for use with a lighting refractor includes a sensor configured to sense at least one of motion or light, and a sensor support. The sensor support includes a housing that receives and supports the sensor, a locking structure operatively associated with the housing and configured to selectively attach the housing to a peripheral portion of a lighting refractor, and an aperture in the housing and arranged to expose the sensor to an environment around the lighting refractor.

According to another exemplary embodiment in accordance with the principles of the invention, a lighting unit assembly includes a lighting unit having a refractor with a peripheral portion, and a sensor support. The sensor support includes a housing configured to receive and support a sensor for sensing at least one of motion or light, a locking structure operatively associated with the housing and configured to selectively attach the housing to the peripheral portion of the refractor, and an aperture in the housing and arranged to expose the sensor to an environment around the refractor.

Various additional features and advantages of the invention will become more apparent to those skilled in the art upon review of the following detailed description taken in conjunction with the accompanying drawings. The drawings, which are incorporated in and constitute a part of this specification, illustrate one or more exemplary embodiments of the invention and, together with the general description given above and the detailed description given below, serve to explain the one or more exemplary embodiments of the invention.

DETAILED DESCRIPTION

Figure 1:
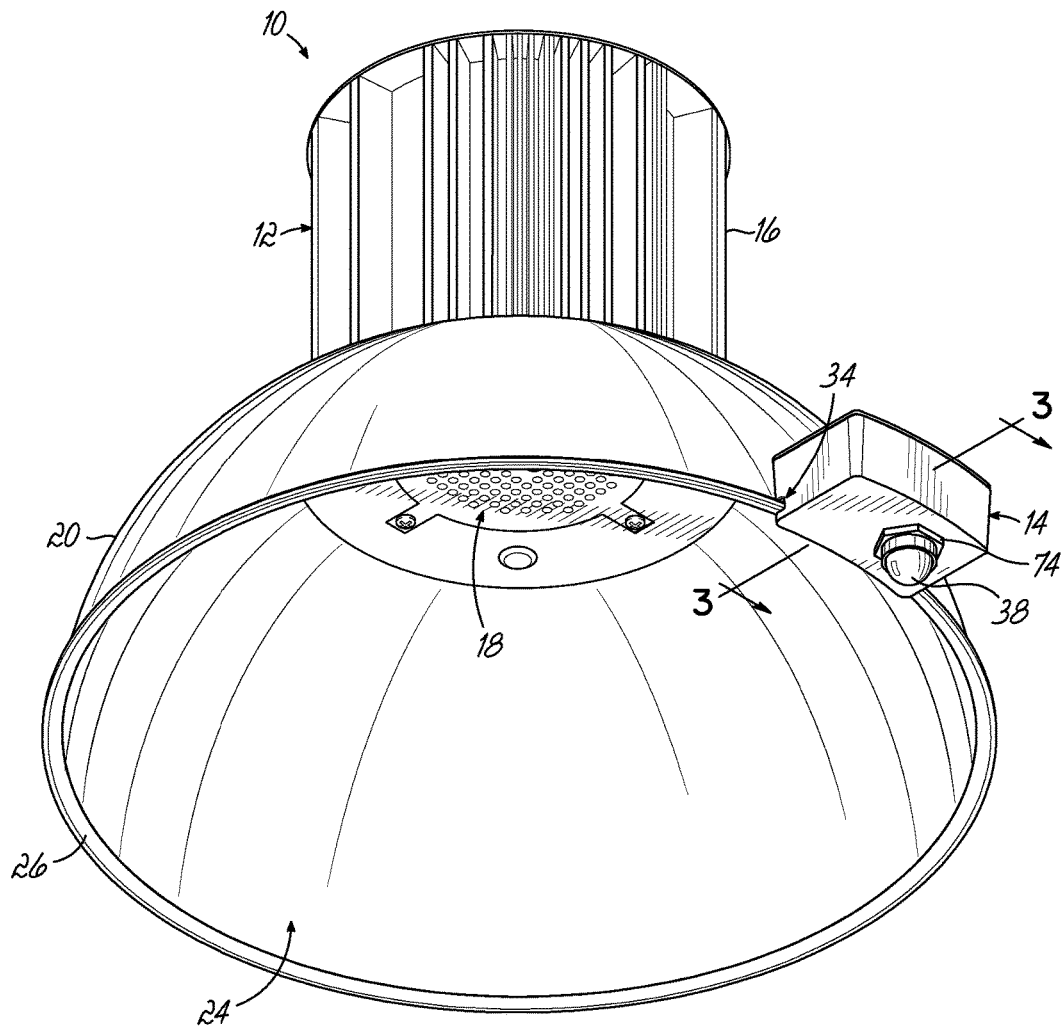
FIG. 1 is a perspective view of an electrical lighting unit assembly including an electrical lighting unit and a sensor support according to an exemplary embodiment of the invention.

Referring to the Figures, FIG. 1 shows an electrical lighting unit assembly 10 including an electrical lighting unit 12 and a sensor support 14 of an exemplary embodiment in accordance with the principles of the invention. The exemplary lighting unit 12 is shown in the form of a low bay/high bay lighting unit, which may be similar to the LED Aureus™ lighting unit available from LSI Industries, Inc. of Cincinnati, Ohio, for example. In alternative embodiments, the lighting unit 12 may be of various alternative types suitable for indoor or outdoor lighting applications. The lighting unit 12 as shown generally includes a unit housing 16 that houses a light source 18, shown in the form of light emitting diodes ("LEDs"), and a refractor 20 coupled to a lower end of the unit housing 16 with any suitable fastening elements, such as self-locking clips (not shown), for example. The refractor 20 may be of various conventional types known in the art. As a non-limiting example, the refractor 20 may be an injection molded acrylic prismatic refractor.

Figure 2:
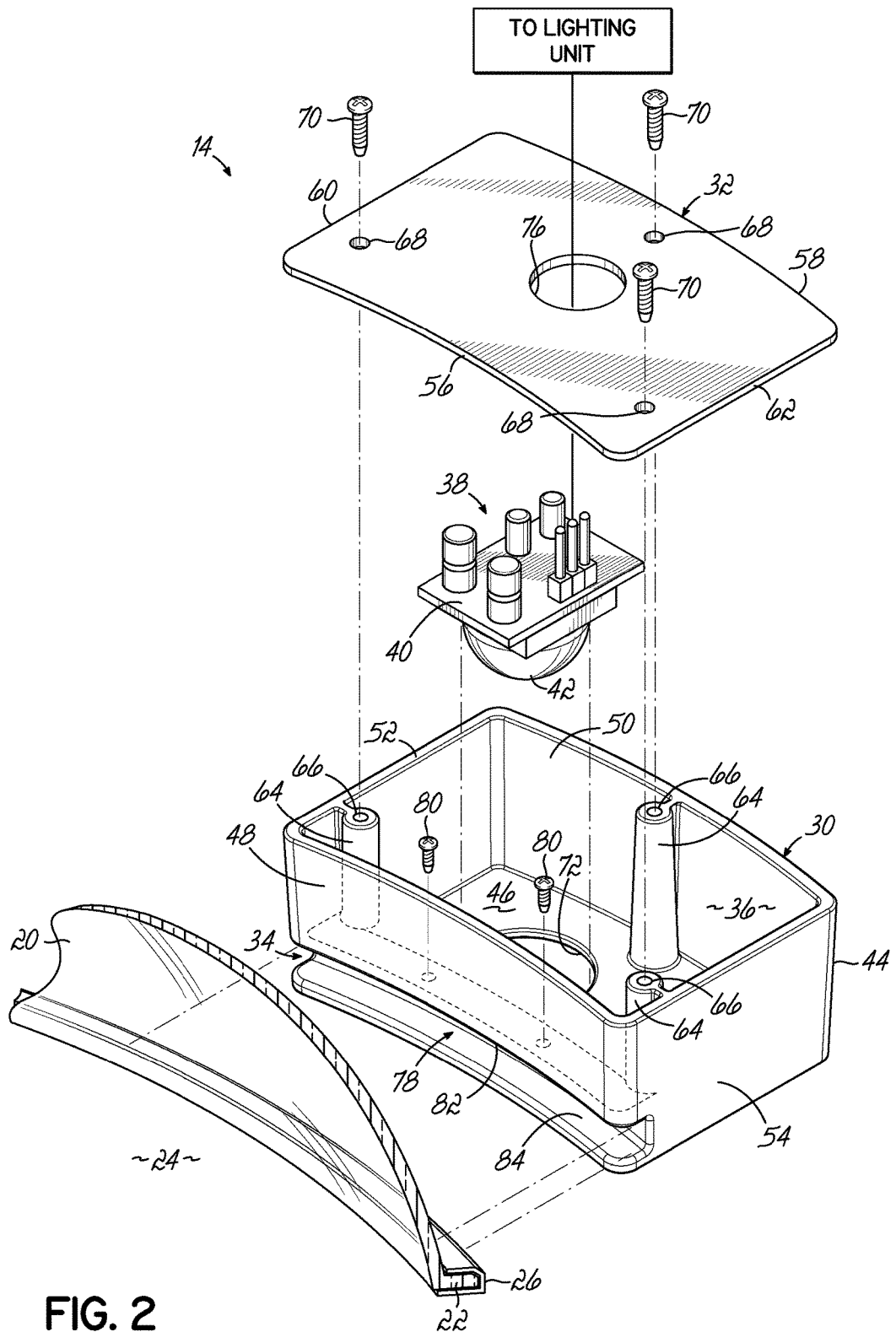
FIG. 2 is a perspective, disassembled view of the sensor support of FIG. 1, showing alignment of the sensor support with a peripheral edge of a refractor of the electrical lighting unit.
Figure 3:
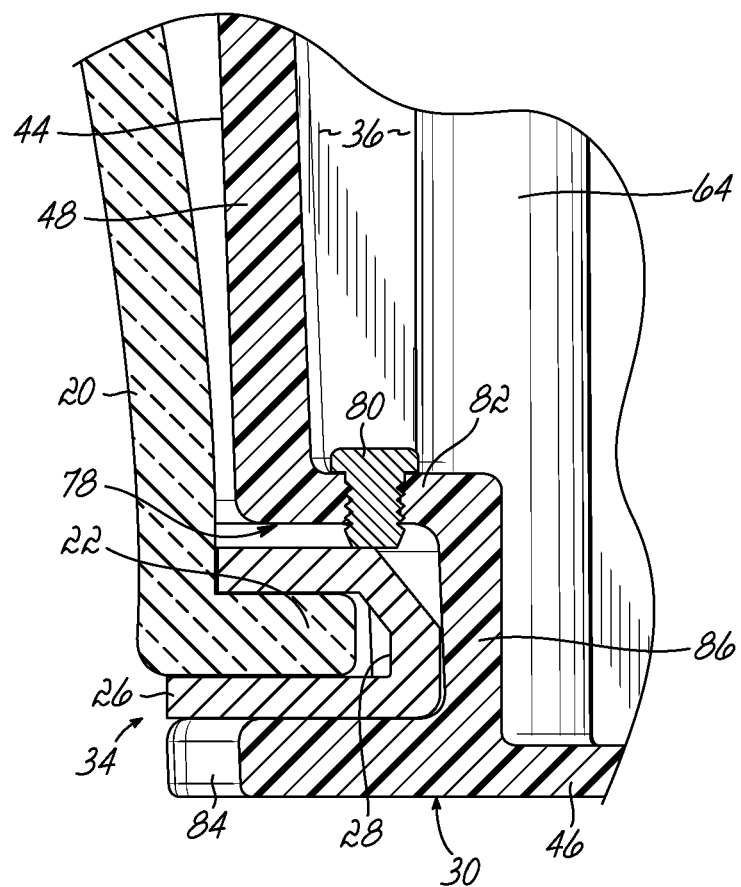
FIG. 3 is a cross-sectional view of the sensor support and refractor of FIG. 1, taken along line 3-3.
Figure 4:
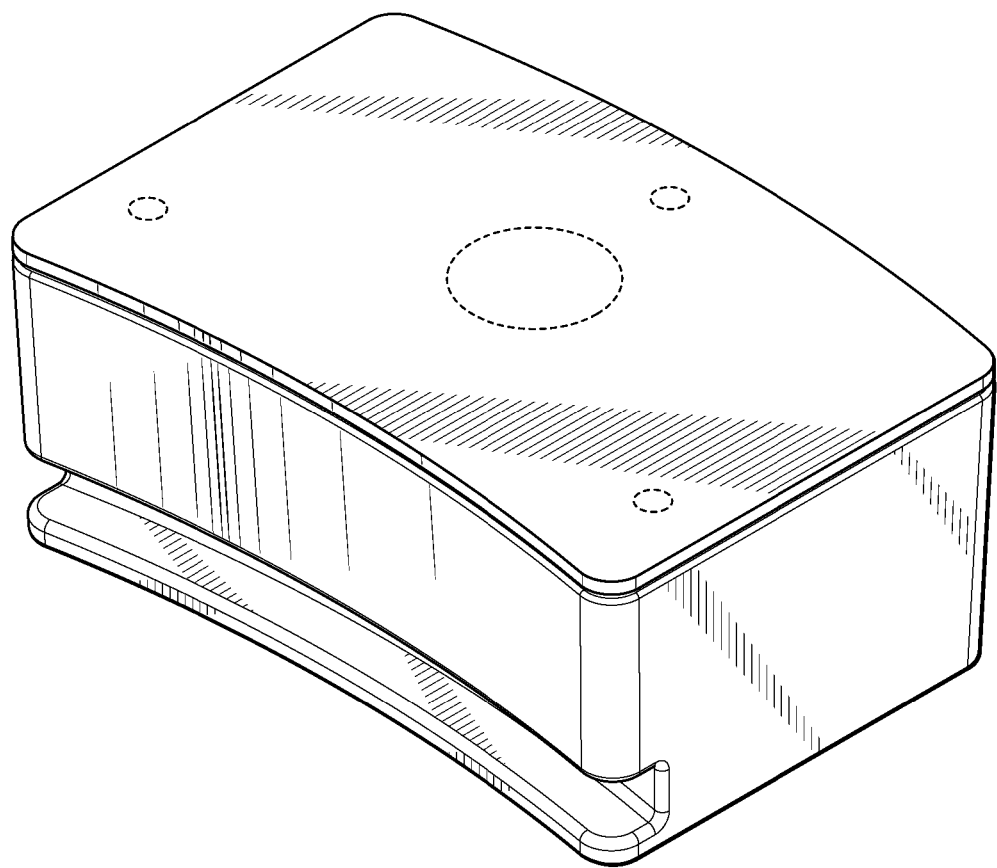
FIGS. 4-14 depict various views of the sensor support of FIG. 1, showing various aspects of the ornamental design of the sensor support.
Figure 5:
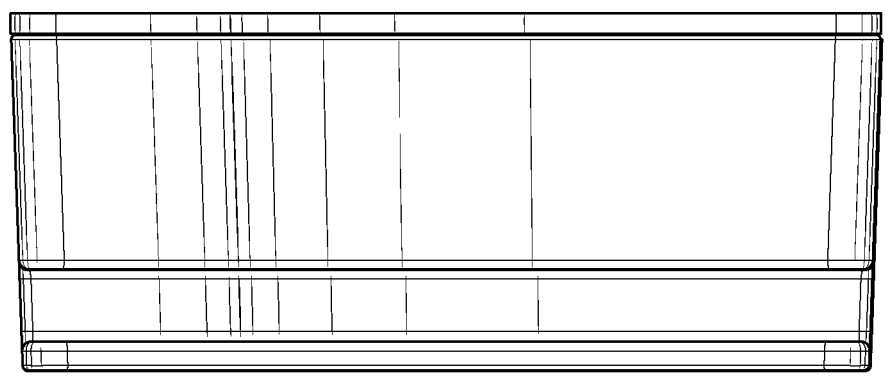
Figure 6:
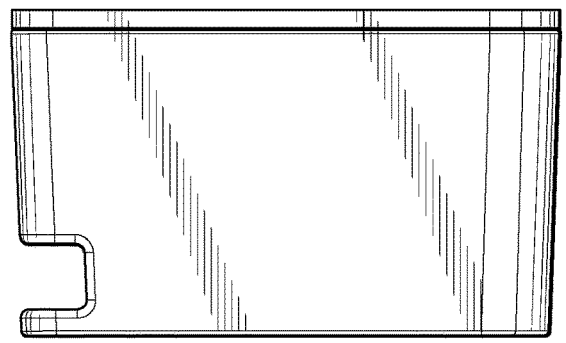
Figure 7:
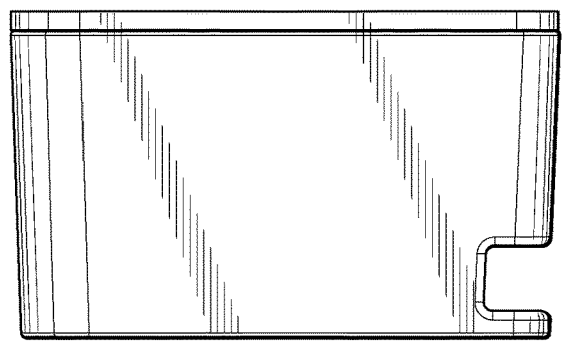
Figure 8:
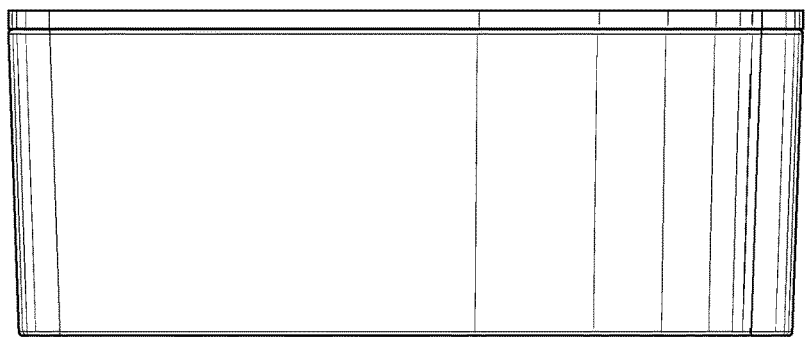
Figure 9:
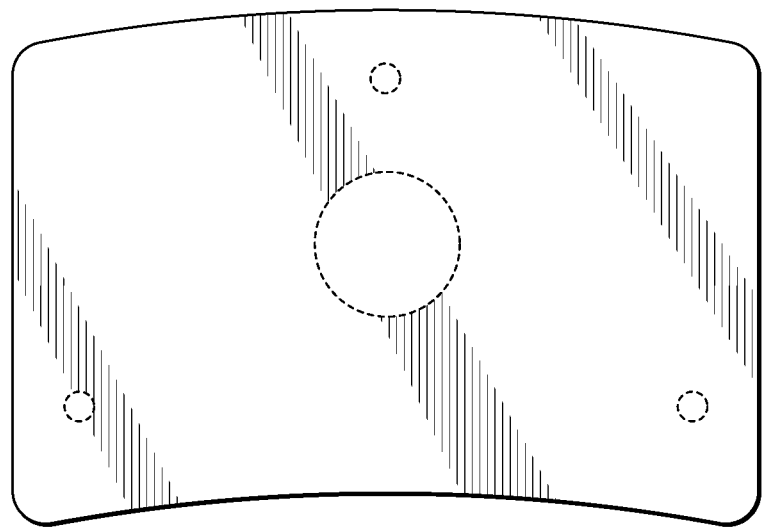
Figure 10:
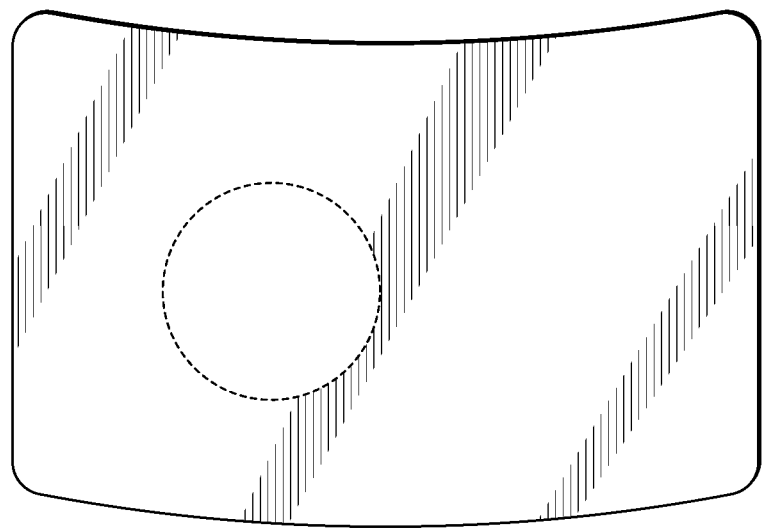
Figure 11:
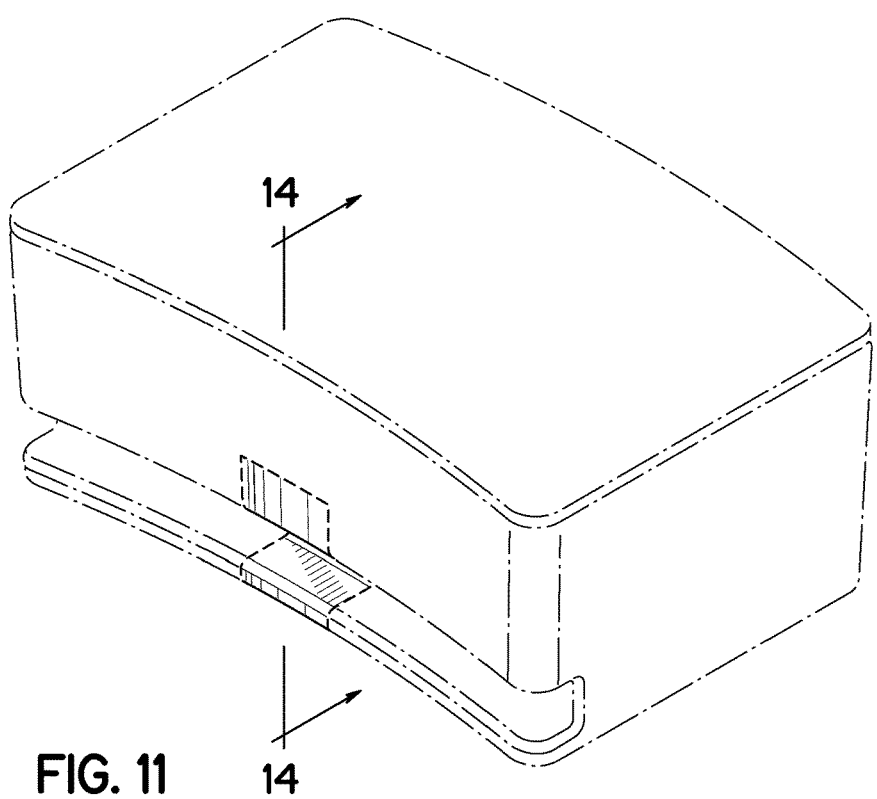
Figure 12:
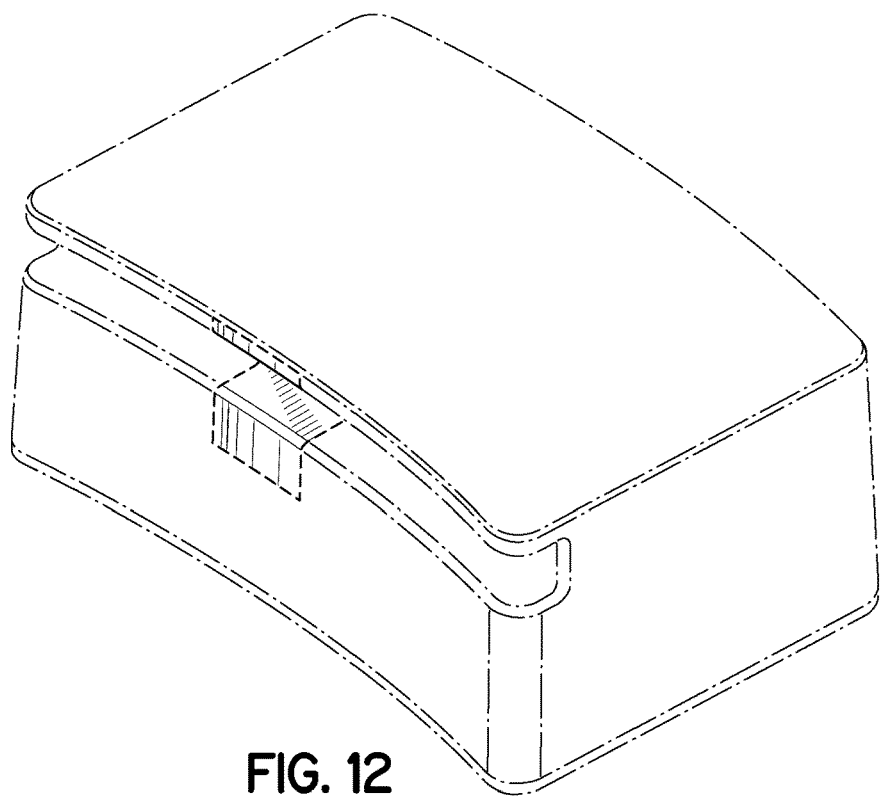
Figure 13:
Figure 14:

With continued reference to FIG. 1 and additionally referring to FIG. 2, a circumferential rim 22 extends radially outward from a lower end of the refractor 20 and defines a peripheral edge and a central opening 24 of the refractor 20. The central opening 24 exposes the light source 18 to an environment beneath, or otherwise surrounding, the lighting unit 12. An annular spring-biased clamp band 26 may be clipped onto an outer edge of the refractor rim 22, and may facilitate attachment of a flat or conical bottom lens (not shown) to the refractor 20, for example. As best shown in FIG. 3, the clamp band 26 includes an annular slot 28 in which the refractor rim 22 is received.

The exemplary sensor support 14 generally includes a lower body 30, a removable top plate 32 that removably couples to the lower body 30, and a locking structure 34 configured to selectively attach the sensor support 14 to the refractor rim 22, as described in greater detail below. The lower body 30 and top plate 32 collectively define a housing having an interior cavity 36 in which a sensor 38 is received and supported. In exemplary embodiments, the sensor 38 may be configured to sense motion or light, for example, and generally includes a circuit board 40 and a lens 42 that covers a detecting element (not shown). It will be appreciated that sensor 38 may be of various alternative types and physical configurations, and that features of the sensor support 14 may be modified as appropriate to accommodate alternative sensor types.

The lower body 30 of the sensor support 14 includes a sidewall 44 and an integrally formed bottom wall 46. The sidewall 44 may be formed with a generally rectangular shape so as to include a front wall 48, a back wall 50, a first end wall 52, and an opposed second end wall 54. The top plate 32 may be formed with a similar, generally rectangular shape so as to include a front edge 56, a back edge 58, a first end edge 60, and an opposed second end edge 62. In alternative embodiments, the lower body 30 and top plate 32 may be formed with various alternative shapes as may be desired. For example, the lower body 30 may be formed with a circular, oval, or any irregular shape, and may gradually taper toward the bottom wall 46 so as to define a generally domed structure.

In the embodiment shown, the lower body 30 may include a plurality of bosses 64 within the interior cavity 36, projecting from the bottom wall 46 toward the top plate 32 and formed integrally with respective portions of the bottom wall 46 and the sidewall 44. As shown in FIG. 2, the bosses 64 may be arranged at the back wall 50, the first end wall 52, and the second end wall 54. Each boss 64 includes a bore 66 and is positioned in alignment with a respective bore 68 formed in the top plate 32. Threaded fasteners 70 are directed through the top plate bores 68 and into the boss bores 66 to releasably couple the top plate 32 to the lower body 30. In alternative embodiments, the top plate 32 may be releasably coupled to the lower body 30 using various other mechanical fastening elements known in the art, such as clamps, detents, magnets, hook and loop fasteners, or the like, for example. Removal of the top plate 32 from the lower body 30 provides access to the interior cavity 36 and components housed therein, including the sensor 38 and adjustable locking elements of the locking structure 34, described below.

The bottom wall 46 of the lower body 30 includes a lower aperture 72 that is suitably sized and shaped to expose at least a portion of the sensor 38, including its detecting element, to an environment around the lighting unit 12. For example, with reference FIGS. 1 and 2, the lower aperture 72 may be circular and formed with a diameter suitable to allow the sensor lens 42 to project through the aperture 72, while retaining the circuit board 40 and corresponding electronic components (e.g., electrical wires, etc.) in the interior cavity 36. As shown in FIG. 1, a retaining nut 74 may be arranged on a lower surface of the bottom wall 46 to engage and secure the sensor 38 to the bottom wall 46.

Referring to FIG. 2, an upper aperture 76 may be formed in the top plate 32 and may be generally aligned with the lower aperture 72 formed in the bottom wall 46. The upper aperture 76 may be suitably sized and shaped to accommodate electrical wires (not shown) that connect the sensor 38 to the lighting unit 12 and/or a sensor power source, for example. Additionally, the interior cavity 36 of lower body 30 may be sized to accommodate slack amounts of the electrical wires in addition to the sensor 38. In alternative embodiments, the sensor 38 may communicate with the lighting unit 12 wirelessly and a sensor power source may be located within the interior cavity 36, for example, in which case the upper aperture 76 may be omitted from the top plate 32.

Referring to FIGS. 2 and 3, the locking structure 34 of the sensor support 14 enables selective attachment of the sensor support 14 to the refractor 20. Generally, the locking structure 34 may include one or more recesses that receive a portion of the refractor rim 22, and one or more adjustable locking elements that lockingly engage and retain the rim 22 within the one or more recesses. In the exemplary embodiment shown in the Figures, the locking structure 34 includes an elongate channel 78 and a pair of threaded fasteners 80. The channel 78 is formed in a lower portion of the front wall 48 of the lower body 30, and the threaded fasteners 80 extend into the channel 78 to engage an upper surface of the clamp band 26 and thereby clamp the clamp band 26 and the rim 22 within the channel 78. In this manner, the sensor support 14 may be cantilevered on the refractor rim 22, as shown in FIGS. 1 and 3.

As best shown in FIG. 2, the channel 78 is formed integrally within the front wall 48, and extends continuously for a full length of the front wall 48 between the first and second end walls 52, 54. In alternative embodiments, the channel 78 may be formed with various other physical configurations. For example, the channel 78 may be defined by one or more ledge-like structures that project laterally outward from the front wall 48, each defining a respective portion of the channel 78. Such structures may be spaced apart and span a full or partial length of the front wall 48.

In the embodiment shown, the front wall 48 and the channel 78 may each extend along an arcuate path having a curvature that complements a curvature of the refractor 20, such as a curvature of the refractor rim 22. Likewise, the front edge 56 of the top plate 32 may be formed with a curvature similar to that of the front wall 48. In this manner, the sensor support 14 closely conforms to an outer periphery of the refractor 20, thereby promoting a secure attachment of the sensor support 14 to the refractor 20 and providing a compact and aesthetically pleasing configuration. Additionally, the channel 78 may be formed with a profile shaped to generally complement a profile of the refractor rim 22. For example, as shown best in FIG. 3, the channel 78 may be formed with a generally rectangular profile that complements generally rectangular profiles of the refractor rim 22 and the clamp band 26.

Referring to FIG. 3, the channel 78 extends laterally into the interior cavity 36 with a depth sufficient to accommodate a majority of a radial width of the refractor rim 22 and the clamp band 26. The channel 78 is bounded by an upper channel wall 82, a lower channel wall 84, and an inner channel wall 86. The lower channel wall 84 may be defined by the bottom wall 46 of the lower body 30. The threaded fasteners 80 are threaded through the upper channel wall 82 and into the channel 78 to engage an upper surface of the clamp band 26, thereby clamping the clamp band 26 and refractor rim 22 within the channel 78, against the lower channel wall 84. The heads of the threaded fasteners 80 may be tightened against a planar surface of the upper channel wall 82, accessible via the interior cavity 36. Further, the threaded fasteners 80 may be formed with any suitable length to accommodate refractor rims 22 and clamp bands 26 of various thicknesses, or alternatively a refractor rim 22 without a clamp band 26.

As best shown in FIGS. 2 and 3, the threaded fasteners 80 may be accessed and adjusted via the interior cavity 36 when the top plate 32 is removed from the lower body 30. While only two threaded fasteners 80 are shown, spaced apart along a length of the channel 78, any suitable quantity and spacing of threaded fasteners 80 may be provided. In alternative embodiments, the clamping effect provided by the threaded fasteners 80 may be enhanced with various additional mechanical fastening elements known in the art. For example, though not shown, one or more additional threaded fasteners may be threaded through the lower channel wall 84 to engage a lower surface of the clamp band 26.

While the exemplary sensor support 14 shown and described herein includes locking structure comprising a channel 78 and threaded fasteners 80, it will be appreciated that various other structure suitable for selectively attaching the sensor support 14 to a peripheral portion of a lighting refractor may alternatively be used.

In exemplary embodiments, the lower body 30 and top plate 32 of the sensor support 14 may be formed of a polymeric material through an injection molding process. It will be appreciated that various alternative materials, including metals for example, and corresponding manufacturing methods may be used.

The sensor support 14 disclosed herein supports the sensor 38 at a position radially outward of the refractor rim 22 so as to avoid blocking light produced by the light source 18 and directed through the refractor opening 24, shown in FIG. 1. Upon sensing a motion, light, or other condition of a surrounding environment, the sensor 38 sends a signal to the lighting unit 12, or to a control unit (not shown) communicating with the lighting unit 12, instructing the lighting unit 12 to energize the light source 18. The lighting unit 12 may later de-energize the light source 18 after a pre-determined length of time during which the condition ceases to be present. In this manner, the sensor support 14 promotes energy-efficient use of the lighting unit 12, while supporting the sensor 38 at a location immediately adjacent to the lighting unit 12 to provide a visually appealing and space-efficient configuration without interfering with light produced by the lighting unit 12.

FIGS. 4-14 illustrate exemplary embodiments of a new, original, and ornamental design for a sensor support for use with luminaires, wherein broken dot-dash lines represent unclaimed portions of the design, and broken dash lines represent unclaimed boundaries.

While the present invention has been illustrated by the description of a specific embodiments thereof, and while the embodiment has been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details shown and described. Accordingly, departures may be made from such details without departing from the scope of the general inventive concept.

What is claimed is:

1. A sensor support for use with a lighting refractor supported on a lighting fixture housing, the sensor support comprising:

a sensor housing defining an interior cavity configured to receive and support a sensor for sensing at least one of motion or light;

a locking structure operatively associated with the sensor housing and configured to selectively attach the sensor housing to a peripheral portion of a lighting refractor; and an aperture in the sensor housing and arranged to expose the sensor to an environment around the lighting refractor, wherein the locking structure includes at least one locking element that is selectively adjustable to clamp the housing to the peripheral portion of the lighting refractor, and further wherein the locking structure further includes a channel configured to receive therein the peripheral portion of the lighting refractor, the at least one locking element being selectively adjustable to clamp the peripheral portion within the channel.

2. The sensor support of claim 1, wherein the channel is formed integrally with the housing.

3. The sensor support of claim 2, wherein the channel is formed in a sidewall of the housing.

4. The sensor support of claim 2, wherein the channel and the sidewall each extend along a respective arcuate path.

5. The sensor support of claim 1, wherein the at least one locking element includes a threaded fastener that extends into the channel to engage the peripheral portion of the lighting refractor.

6. The sensor support of claim 5, wherein the threaded fastener is accessible for adjustment via the interior cavity of the housing.

7. The sensor support of claim 1, wherein the channel is provided on a side of the housing so that the housing is cantilevered when attached to the peripheral portion of the lighting refractor.

8. The sensor support of claim 1, wherein the housing includes a sidewall and a bottom wall, the locking structure being provided on the sidewall and the aperture being formed in the bottom wall.

9. The sensor support of claim 1, wherein the housing includes a removable top plate that provides access to the interior cavity.

10. A sensor assembly for use with a lighting refractor supported on a lighting fixture housing, the sensor assembly comprising:

a sensor configured to sense at least one of motion or light; and a sensor support including a sensor housing that receives and supports the sensor, a locking structure operatively associated with the sensor housing and configured to selectively attach the sensor housing to a peripheral portion of a lighting refractor, and an aperture in the sensor housing and arranged to expose the sensor to an environment around the lighting refractor, wherein the locking structure includes at least one locking element that is selectively adjustable to clamp the housing to the peripheral portion of the lighting refractor, and further wherein the locking structure further includes a channel configured to receive therein the peripheral portion of the lighting refractor, the at least one locking element being selectively adjustable to clamp the peripheral portion within the channel.

11. A lighting unit assembly, comprising:
a lighting unit including a refractor supported on a lighting fixture housing, the refractor having a peripheral portion; and
a sensor support including a sensor housing configured to receive and support a sensor for sensing at least one of motion or light, a locking structure operatively associated with the sensor housing and configured to selectively attach the sensor housing to the peripheral portion of the refractor, and an aperture in the sensor housing and arranged to expose the sensor to an environment around the refractor,
wherein the locking structure includes at least one locking element that is selectively adjustable to clamp the housing to the peripheral portion of the refractor,
and further wherein the locking structure further includes a channel that receives therein the peripheral portion of the refractor, the at least one locking element being selectively adjustable to clamp the peripheral portion within the channel.

12. The sensor support of claim 11, wherein at least one of the channel or the housing is formed with a shape that is complementary to a shape of the refractor.

13. The sensor support of claim 12, wherein the channel is formed in a sidewall of the housing, and the channel and the sidewall each extend along a respective arcuate path having a curvature that complements a curvature of the peripheral portion of the refractor.

* * * * *